United States Patent [19]

Khan

[11] Patent Number: 5,264,009

[45] Date of Patent: Nov. 23, 1993

[54] PROCESSING OF SEWAGE SLUDGE FOR USE AS A FUEL

[75] Inventor: Motasimur R. Khan, Wappingers Falls, N.Y.

[73] Assignee: Texaco Inc., White Plains, N.Y.

[21] Appl. No.: 938,810

[22] Filed: Sep. 1, 1992

[51] Int. Cl.$^5$ .......................... C10J 3/46; C02F 11/06
[52] U.S. Cl. .................. 48/197 R; 48/197 A; 48/209; 48/DIG. 7; 110/346; 210/758; 210/770; 210/774
[58] Field of Search ................. 48/197 R, 197 A, 206, 48/202, 209, DIG. 7; 202/373; 44/280; 110/346, 347, 342, 341, 348; 210/758, 763, 770, 769, 774, 603, 761

[56] References Cited

U.S. PATENT DOCUMENTS

| | | | |
|---|---|---|---|
| 4,762,527 | 8/1988 | Beshore et al. | 44/280 |
| 4,810,259 | 3/1989 | Bakitsky et al. | 44/280 |
| 4,933,086 | 6/1990 | McMahon et al. | 48/197 A |
| 4,983,296 | 1/1991 | McMahon et al. | 48/197 A |
| 5,188,739 | 2/1993 | Khan et al. | 48/197 A |
| 5,188,741 | 2/1993 | Zang et al. | 210/770 |
| 5,211,724 | 5/1993 | Khan et al. | 48/197 R |

*Primary Examiner*—Peter Kratz
*Attorney, Agent, or Firm*—James J. O'Louglin; Albert Brent

[57] ABSTRACT

A process for disposing of sanitary sewage sludge by producing a pumpable slurry of sewage sludge with or without solid carbonaceous fuel and burning said slurry as fuel in a partial oxidation gas generator, furnace, or boiler. The aqueous slurry of sewage sludge is concentrated by removing water by means of a conventional belt filter press, centrifuge, or hydroclone. The dewatered slurry of sewage sludge is preheated and sheared; hydrothermally treated; and its solids content increased. A chelating agent, for example an aminopolycarboxylic acid or a hydrocarboxylic acid is mixed with the aqueous slurry of sewage sludge during the preheating and shearing step and/or the step for increasing its solids content. By means of the subject process, the viscosity of the slurry of sewage sludge with or without solid carbonaceous fuel is reduced and coagulation is suppressed. A pumpable aqueous slurry of sewage sludge with or without solid carbonaceous fuel is produced and burned with a free-oxygen containing gas in a partial oxidation gasifier, furnace, boiler, or incinerator to produce a hot raw effluent gas stream. In a preferred embodiment, the effluent gas stream is cleaned and purified and non-contaminating ash and slag are separated. By this process, noxious sewage sludge may be disposed of without contaminating the environment. By-product synthesis gas, reducing gas, or fuel gas may be produced.

9 Claims, No Drawings

5,264,009

PROCESSING OF SEWAGE SLUDGE FOR USE AS A FUEL

FIELD OF THE INVENTION

This invention relates to the processing of sanitary sewage sludge for use as a fuel in a partial oxidation gas generator, furnace, or boiler.

Treatment of sewage sludge is discussed in coassigned U.S. Pat. No. 3,507,788. Sewage sludge is gasified in a partial oxidation process described in coassigned U.S. Pat. No. 3,687,646. Upgrading aqueous slurries of sewage sludge by shearing without heating is described in coassigned U.S. Pat. No. 4,933,086. Agglomerating the organic matter in aqueous slurries of sewage sludge by heating, is described in coassigned U.S. Pat. No. 4,983,296. However, none of these references taken singly or in combination, teach or suggest the subject invention by which a concentrated aqueous slurry of sewage sludge in admixture with a chelating agent is subjected to hydrothermal treatment and processed to increase the solids content. The viscosity of a pumpable slurry of sewage sludge for a given solids content is thereby reduced and coagulation is suppressed. A pumpable slurry fuel feed for burning in a partial oxidation gasifier, furnace, boiler, or incinerator is thereby made.

SUMMARY OF THE INVENTION

This invention pertains to an improved process for disposing of sanitary sewage sludge comprising:

(1) concentrating an aqueous slurry of sewage sludge to a solids content in the range of about 5 to 35 wt. %;

(2) preheating and shearing the dewatered aqueous slurry of sewage sludge from (1) at a temperature in the range of about 130° F. to 210° F. in the absence of air, and holding said material at said elevated temperature for about 0.5 to 5.0 minutes;

(3) heating the aqueous slurry of sewage sludge from (2) in the absence of air at a temperature in the range of about 300° F. to 450° F. and at a pressure above the vapor pressure of water at that temperature, and holding said material at said elevated temperature for about 1.0 to 10.0 minutes;

(4) hydrothermally treating the aqueous slurry from (3) in an autoclave in the absence of air and holding said material in said autoclave for about 30 to 90 minutes at a temperature in the range of about 475° F. to 550° F. and a pressure above the vapor pressure of water at that temperature;

(5) increasing the solids content of the aqueous slurry of sewage sludge from (4) to about 30 to 58 wt. %;

(6) mixing a chelating agent in the amount in the range of about 0.05 to 1.0 wt. % with the aqueous slurry of sewage sludge in steps (2) and/or (5) to reduce the viscosity of the aqueous slurry of sewage sludge and to suppress coagulation; and (7) burning said pumpable slurry of sewage sludge from (5) in a partial oxidation gasifier, furnace, boiler, or incinerator to produce a hot raw effluent gas stream.

In one embodiment to avoid contaminating the environment, the effluent gas stream from (7) is cleaned, purified, and non-contaminating fly-ash and slag are separated from the gas stream.

DESCRIPTION OF THE INVENTION

Sewage sludge is a heterogeneous mixture of complex organic and inorganic materials. The term "sewage sludge" as used herein may be broadly defined as "water-carried wastes", particularly from municipal sanitary sewage lines, containing at least one of the following: body waste (excreta), household wastes, community waste such as street washings, etc., and industrial wastes and sludges. The total solids content of the sewage in municipal lines is usually about 500 parts per million (p.p.m.) or more. The solids in sewage are mostly animal or vegetable substances, "organic matter", i.e., fats, carbohydrates, and proteins. Some mineral or inorganic constituents present include sand and clay, as well as the common mineral salts found in the water supply. Sewage sludge is obtained from raw sewage and may contain a number of pathogens known to be health hazards to humans. Almost any type of microorganism may be found in sewage, including bacteria, protozoans, viruses and fungi.

Sewage sludge does not behave as a Newtonian fluid. Accordingly, any analyses of sludge flow behavior in pipes is rather difficult. A major problem is the energy (head) loss in sludge transfer due to friction. Sludge slurries with 10-15% concentration can be pumped provided high friction losses are allowable. The physical state of sludge depends upon the amount of moisture present in the sludge and on the nature of the sludge. As the moisture content decreases, the sludge changes state from a true liquid to a semi-solid and ultimately to a dry solid. Through the use of gravity thickening the sludge could approach 3-5% by weight of solids concentration. However, the void spaces between the particles are still filled with water. As the moisture content decreases further, the solids are pushed closer together. The capillary forces continue to increase in the pore structure which progressively decreases the sludge volume. At this point the sludge is considered almost solid (plastic or semi-solid) rather than a liquid. With a further reduction in water content the nature of sludge is changed to such a state that it will not flow under its own weight. Plastic sludges are cohesive in nature due to the surface chemical activity and the bonding properties of the organic and inorganic colloidal materials present.

With landfills closing, ocean dumping being curtailed, and high-technology incinerators becoming unpopular in many areas, communities are finding that it is getting increasingly more difficult and expensive to dispose of their sewage sludge. Pumpable aqueous slurries of sewage sludge are made by the subject process containing high concentrations of sewage sludge. The pumpable slurry may be used as a fuel in a partial oxidation gas generator and may be thereby disposed of without contaminating the atmosphere. After cleaning and removal of undesirable gases e.g. $H_2O$, $H_2S$, COS, $CO_2$, a non-polluting hot raw effluent gas stream comprising at least one of the following is produced: synthesis gas, reducing gas and fuel gas. In one embodiment, the slurry may be burned by complete combustion in a boiler thereby producing by-product steam and hot water. Alternatively, the pumpable slurry may be incinerated or used as fuel in a furnace. Noxious sewage sludge is safely disposed of by the subject process without polluting the nation's environment. Non-contaminating ash and slag are separated from the gas stream. The ash and slag may be used for road bed fill and for making cement blocks. Further, the subject process allows a greater amount of sewage sludge to be fed to a partial oxidation gasifier, boiler, or incinerator while requiring less energy per unit mass of sewage sludge processed.

A typical ultimate analysis of sewage sludge is shown in Table I. A typical ultimate analysis of inert non-combustible materials in sewage sludge is shown in Table II.

TABLE I

TYPICAL ULTIMATE ANALYSIS OF COMBUSTIBLES IN SEWAGE SLUDGE

| ELEMENT | WT. % |
| --- | --- |
| CARBON | 54.6 |
| HYDROGEN | 7.9 |
| NITROGEN | 4.5 |
| OXYGEN | 32.0 |
| SULFUR | 1.0 |

TABLE II

TYPICAL ANALYSIS OF INERT NON-COMBUSTIBLE MATERIALS IN SEWAGE SLUDGE

| ELEMENT | MG/KG DRY SOLIDS |
| --- | --- |
| Total Sodium | 1,515 |
| Water Soluble Sodium (mg/l) | 83 |
| Total Potassium | 800 |
| Water Soluble Potassium (mg/l) | 53 |
| Arsenic | 4.58 |
| Beryllium | 0.38 |
| Cadmium | 3.27 |
| Chromium | 244 |
| Copper | 289 |
| Iron | 150 |
| Lead | 147 |
| Zinc | 468 |
| Nickel | 63 |
| Mercury | 0.68 |

The economics of gasifying sewage sludge depend greatly on the tipping fee received from the sludge generating community and the concentration of sewage sludge that can be included in a pumpable slurry destined for the gasifier. Mixtures of sewage sludge and solid carbonaceous fuel that contain sufficient sewage sludge to be profitably burned were found to be too viscous to be pumped. This problem and others have been overcome by the subject invention.

Sewage sludge is obtained from raw sewage by conventional processing steps and equipment. For example, the sewage from municipal sewage lines is passed through bar screens for the removal of large pieces of stone, wood, metal, and other trash which would clog channels or damage pumps. Coarse heavy inorganic noncombustibles, i.e. gravel, cinders, and sand are then settled out in a grit chamber. The sewage is then separated into an aqueous suspension of sewage sludge and liquids. Concentration of the sewage may be accomplished by any suitable way for separating solids and liquids, e.g. gravity settling, filtration, centrifugation, hydroclone, or a combination thereof. For example, a preferable preliminary procedure is to introduce the screened over-flow from the grit chamber into a primary sedimentation tank such as a continuous clarifier as shown in Perry's Chemical Engineers' Handbook, McGraw-Hill, Fourth Edition, 1963, page 19-50. Detention time in the sedimentation tank is sufficient for producing a pumpable aqueous slurry of primary sludge having a solids content of about 0.5 to 20 wt. %, in about 1 to 24 hours. The primary sedimentation tank may also serve as a hold-up tank to even out discontinuities in the sewage composition. Alternatively, a separate holding tank may be used. In one embodiment, an aqueous slurry of secondary sewage sludge is introduced into the holding tank and mixed with the primary sewage sludge. Secondary sewage sludge has a solids content in the range of about 1 to 10 wt. % and is derived from the liquid overflow from the previously mentioned primary sedimentation tank. The liquid overflow is processed in a conventional manner in order to produce secondary sewage sludge, to reduce the BOD and organic solids content, and to purify and demineralize the waste water which is separated from the secondary sewage sludge. Treatment of the liquid overflow from the primary sedimentation tank may include a combination of any or preferably all of the following steps, depending upon the end use of the water: pH adjustment; reduction of organic solids and BOD to about 20 parts per million or below, preferably by aerated biochemical treatment; clarification, optionally with coagulation; filtration or centrifugation; demineralizing; activated carbon treatment; and disinfection to control bacteria for example by chlorination. Excessively acidic or basic waste waters may be neutralized and the pH adjusted to a level in the range of about 6 to 9. Anaerobic and aerobic biological treatment processes are preferably used to economically abate the bacterial oxygen-consuming pollution caused by the discharge of waste water contaminated with low concentrations of organic matter. Suitable conventional biological processes that may be used include activated sludge units, aerated stabilization basins, and trickling filters. For additional description, see coassigned U.S. Pat. No. 3,687,646, which is incorporated herein by reference.

The water separated from the sewage sludge may be purified by conventional means. The purified water may be then used subsequently in the process. For example, the water may be used as a coolant of the product gas from the partial oxidation gasifier by direct contact in a quench tank or by indirect heat exchange in a waste heat boiler. By-product steam may be produced after dissolved solids are removed. The hot water or steam may be used for indirect heat exchange with other streams in the subject process. For example, the hot water or steam may be used to preheat the aqueous suspension of sewage sludge. Hot water separated from the system may be used to prepare aqueous slurries of solid carbonaceous fuel e.g. coal. Excess water may be discharged from the system or used externally for industrial applications. The sludge underflow from the primary sedimentation tank comprising primary sewage sludge or from the holding tank comprising primary sewage sludge in admixture with secondary sewage sludge having a solids content of at least 3 wt. % is dewatered further to produce an aqueous slurry of sewage sludge having a solids content in the range of about 5 to 35 wt. %. Dewatering may be achieved by conventional means, e.g. filter press, hydroclone, centrifuge.

Preparation of a highly loaded sludge-water slurry with desirable rheological properties requires an understanding of primary sludge characteristics and the relationship of these characteristics to the basic interactions among sludge particles. Since the sludge materials contain numerous chemically active sites, the factors which influence the slurry properties are many.

In a preferred embodiment of the subject process, an aqueous slurry of sewage sludge having a solids content in the range of about 5 to 35 wt. % is heated, mixed with a chelating agent, hydrothermally treated, increased in solids content to about 30 to 58 wt. %, and reacted as feed in a partial oxidation gasifier to produce synthesis gas, fuel gas, or reducing gas or burned in a furnace, boiler or incinerator to produce a stream of flue gas.

It was unexpectedly found that the morphology of sewage sludge is changed by treating the sewage sludge as specified herein. For example, bound water is released and slurry making is optimized. Slurries containing a higher concentration of solids can be achieved. In the subject process, sewage sludge is first concentrated to a solids content of about 5 to 35 wt. % by means of conventional methods. For example, the aqueous slurry of sewage sludge may be pressed between two moving belts that pass between and over rollers. Liquid water is thereby quickly pressed from the material between the belts. For example, the Andritz Co., Arlington, Tex., Continuous Press Filter operating at ambient conditions with a surface pressure of about 20 psi or more will produce a press cake having a solids content in the range of about 20 to 35 wt. % or more. In another embodiment, the sewage sludge may be concentrated by a combination of continuous belt pressure filtering and centrifuging. For example, after first concentrating the sewage sludge in a belt filter press, additional dewatering is provided by heating the slurry of sewage sludge to a temperature in the range of about 212° F. to 285° F. and centrifuging.

Preferably, the aforesaid concentration takes place before any significant bacterial action occurs that consumes carbon and organic materials in the sewage sludge.

In the next step, the dewatered slurry of sewage sludge having a solids content in the range of about 5 to 35 wt. % is simultaneously preheated and mildly sheared at a temperature in the range of about 130° F. to 210° F., such as about 150° F. to 200° F. in the absence of air for a period in the range of about 0.5 minutes to 60 minutes, such as about 1 minute to 5 minutes. In this step, the aqueous slurry of sewage sludge is continuously passed through a steam jacketed horizontal tubular shaped mixing and shearing means containing a plurality of rotating agitators and comprising one or two parallel rotatable shafts with each shaft containing a plurality e.g. about 6 to 30 of agitators or mixing paddles or blades. One embodiment has two parallel shafts of agitators which rotate in the same direction at a speed of about 50 to 600 rpm within a chamber that conforms closely to the shape of the agitator assembly thereby providing a close clearance e.g. about 0.030" to 0.060" between the agitators and the inside wall of said chamber. A most effective mixing, shearing and self-cleaning action is thereby provided. For example, a suitable continuous processor is made by Teledyne Readco of York, Pa. See U. S. Pat. No. 3,823,921, which is incorporated herein by reference. The flow rate of material through this continuous processor is in the range of about 50 to 600 lbs per minute. The rate of shear is about 20 to 500 sec$^{-1}$, such as about 100 to 300 sec$^{-1}$. The particle size is in the range of about 1 to 1000 microns, such as about 20 to 200 microns. A homogeneous pumpable slurry having a solids content in the range of about 5 to 35 wt. % and a viscosity of less than about 2000 centipoise when measured at 180° F., such as less than about 1200 centipoise when measured at 180° F., is thereby produced.

A significant portion of the dry-weight of sewage sludge is mineral matter. The materials present in the sewage sludge leaches into the water in which the sewage sludge is dispersed over the extended period of contact. Effective dispersion or suspension of sludge in water necessitates that the sewage sludge particles are completely surrounded and protected from contacting one another. However, as the mineral matter in sewage sludge dissolves into water, flocculation of the sewage sludge particles is promoted through collapse of the protective layer between the particles.

It was unexpectedly found that by mixing the aqueous slurry of sewage sludge while being heated to a temperature in the range of about 130° F. to 210° F. with about 0.05 to 1.0 wt. % of a chelating agent, the chelating agent formed complexes with soluble mineral matter from the sewage sludge and thus prevented collapse of the protective water layer surrounding the sludge particle. The viscosity of the sludge-water slurry was maintained relatively low over time by the chelating agents because the mineral matter present on the sludge surface slowly dissolved into the aqueous medium (as the chelating agent present in the slurry continued to form complexes). This prevented the newly dissolved mineral matter from collapsing (or disturbing) the sludge particle's protective water layer. Thus, the coagulation of sludge during storage of the aqueous sewage sludge slurry is suppressed. The presence of the chelating agent also reduced the undesirable deposit formation on the burner surfaces during gasification of sludge or sludge coal mixtures.

The preferred chelating agent is aminopolycarboxylic acid with 2-3 carboxyl groups such as nitriloacetic acid or hydrocarboxylic acid which are capable of forming complexes with $Al^{3+}$, $Fe^{3+}$, $Mg^{2+}$ and $Ca^{2+}$ ions.

Other suitable chelating agents may be selected from the group consisting of ethylenediaminetetracetic acid (EDTA), hydroxyethylenediaminetetracetic acid, N-dihydroxyethylene acid, and N-dihydroxyethylene glycerine.

Still other suitable chelating agents may be selected from the following groups of organic acids: tartaric acid, citric acid, gluconic acid and 5-sulfosalicyclic acid.

It was unexpectedly found that the subject chelating agents provide a rapid reduction in viscosity and may prevent sludge materials from flocculating the sewage sludge which results in viscosity increases over time. In one embodiment, the presence of the subject chelating agents prevents crosslinking of polymeric stabilizers and surfactants. Slurry fluidity is thereby maintained during storage over an extended period of time. The use of the subject chelating agents e.g. EDTA reduces the amount of surfactant that otherwise may have to be used if the chelating agent was not present.

Next, the preheated and sheared slurry of sewage sludge is hydrothermally treated in two stages. The first stage preferably takes place in a conventional double tube indirect heat exchanger, spiral heat exchanger, or shell and tube heat exchanger. The aqueous slurry of sewage sludge containing the chelating agent is heated at a temperature in the range of about 300° F. to 450° F. in the absence of air and at a pressure which is at or above the vapor pressure of water at the heat treating temperature for about 1.0 to 10.0 minutes. In one embodiment, the preheated and sheared aqueous slurry of sewage sludge is heated in the first hydrothermal stage by direct contact with nitrogen gas or steam.

After the aforesaid first hydrothermal step, the aqueous slurry of sewage sludge is hydrothermally treated in an autoclave. Thus, the sewage sludge from the first hydrothermal stage is again hydrothermally treated but this time in an autoclave at a temperature in the range of about 475° F. to 550° F., in the absence of air, for a residence time of about 30 to 90 minutes and at a pressure which is at or above the vapor pressure of water at said temperature. A pumpable aqueous slurry of sewage sludge is thereby produced having a viscosity of less than about 700 centipoise when measured at about 180° F. In the autoclave, the aqueous slurry of sewage sludge may be heated by direct or indirect heat exchange. For example, steam or partially cooled synthesis gas produced downstream in the partial oxidation process may be passed in direct or indirect heat exchange with the slurry of sewage sludge. Hydrothermal treating of sewage sludge as previously described causes decarboxylation and dehydrogenation of the sewage sludge. The sewage sludge fibers and gel structure break down. It was unexpectedly found that the higher heating value (HHV) of the carbonaceous fuel is upgraded about 10 to 20% by this two-stage hydrothermal treatment. Sewage sludge with a particle size in the range of about 5 to 20 microns is thereby produced. Aqueous slurries of sewage sludge with highly pumpable characteristics are thereby produced. Off-gas from the hydrothermal reactors comprising $CO_2$, $H_2O$, $H_2S$ and COS is sent to a conventional odor control unit and/or disinfecting zone. Noxious gases are thereby safely disposed of without polluting the nation's environment.

In one embodiment, hot water at a temperature in the range of about 300° F. to 500° F. may be removed from hydrothermal reactors and may be used in indirect heat exchange with the slurry of sewage sludge going to the hydrothermal reactor. In another embodiment, at least a portion of the fuel gas produced by the subject partial oxidation mode is used to provide the thermal energy in the aforesaid preheating and hydrothermal steps.

After the second hydrothermal step, the solids content of the hydrothermally treated aqueous slurry of sewage sludge is increased to a value in the range of about 30 to 58 wt. % to provide a pumpable aqueous slurry of sewage sludge with or without solid carbonaceous fuel by any one or a combination of the following steps:

(a) Flash evaporation of excess water.
(b) Cooling said aqueous slurry of sewage sludge to a temperature in the range of about 75° F. to 150° F. and flashing off and/or centrifuging off excess water.
(c) Cooling said aqueous slurry of sewage sludge to a temperature in the range of about 75° F. to 180° F. and adding dry powdered solid carbonaceous fuel.
(d) Cooling said aqueous slurry of sewage sludge to a temperature in the range of about 75° F. to 180° F. and mixing same with a pumpable aqueous slurry of solid carbonaceous fuel having a solids content in the range of about 45 to 60 wt. %. A pumpable aqueous slurry of sewage sludge and solid carbonaceous fuel is thereby provided having a solids content in the range of about 48 to 58 wt. % and containing about 8 to 60 wt. % sewage sludge and having a temperature in the range of about 80° F. to 145° F.

By definition, the term solid carbonaceous fuel, as used herein and in (c) and (d) above to describe suitable solid carbonaceous materials is intended to include various materials and mixtures thereof from the group consisting of coal, coke from coal, char from coal, petroleum coke, particulate carbon soot, oil shale, tar sands, asphalt, wood, and pitch. All types of coal may be used including anthracite, bituminous, and lignite. The particulate carbon may be that which is obtained as a by-product of the subject partial oxidation process (to be further described), or that which is obtained by burning fossil fuels. The term solid carbonaceous fuel also includes by definitions semi-solid organic materials such as asphalt, rubber and rubber-like materials including rubber automobile tires which may be ground or pulverized to the aforesaid particle size. Any suitable grinding system may be used to convert the solid carbonaceous fuels or mixtures thereof to the proper size.

The moisture content of the solid carbonaceous fuel particles is in the range of about 0 to 2 weight percent and preferably 0 to 1 weight percent. Predrying may be required in some instances to reach these levels.

The solid carbonaceous fuels are preferably ground to a particle size so that 100% of the material passes through an ASTM E 11-70 Sieve Designation Standard 425 $\mu$ (Alternative No. 40) and at least 80% passes through an ASTM E 11-70 Sieve Designation Standard 75 (Alternative No. 200). 1000 $\mu$=1 mm. The ground solid carbonaceous fuel is then introduced into a storage hopper at room temperature and atmospheric pressure.

The higher heating value (HHV) of the slurry of sewage sludge with or without solid carbonaceous fuel as previously produced is in the range of about 6,000 to 12,000 BTU/Lb, say about 6,500 BTU/Lb. All of the higher heating values expressed herein are on the dry basis for the materials.

In one embodiment, the previously described chelating agent, in the amount of about 0.05 to 1.0 wt. %, in addition to that added previously, may be introduced into the hydrothermally treated sewage sludge at the time that the solids content is increased. Alternatively, all of the chelating agent may be introduced at the time that the solids content is increased or at the time when originally specified e.g. when the dewatered aqueous slurry of sewage sludge is preheated and sheared. The expression "A and/or B" is used herein in its usual manner. It means either A or B or any combination of A+B.

The pumpable slurry of sewage sludge optionally in admixture with solid carbonaceous fuel having a solids content in the range of about 30 to 58 wt. % is burned in a partial oxidation gasifier, furnace, boiler, or incinerator to produce an effluent gas stream. In one embodiment, the effluent gas stream is washed and purified. Non-polluting ash and noxious gases are removed by conventional means. Contamination of the environment is prevented.

In a preferred embodiment, the fuel feedstream, for example, the aqueous slurry of sewage sludge with or without solid carbonaceous fuel, and a stream of free-oxygen containing gas are introduced by means of a burner into a free-flow unobstructed down-flowing vertical refractory lined steel wall pressure vessel where the partial oxidation reaction takes place. A typical gas generator is shown and described in coassigned U. S. Pat. No. 3,544,291, which is incorporated herein by reference. The burner assembly is inserted downward through a top inlet port of the noncatalytic synthesis gas generator. The burner extends along the central longitudinal axis of the gas generator with the downstream end discharging a multiphase mixture of fuel, free-oxygen containing gas, and temperature moderator directly into the reaction zone.

A three or four stream annular-type burner, such as shown and described in coassigned U. S. Pat. Nos.

3,847,564 and 4,525,175, which are incorporated herein by reference, is preferably used to introduce the feedstreams into the partial oxidation gas generator. Other suitable burner designs may be used. For example, with respect to U. S. Pat. No. 3,847,564, free-oxygen containing gas may be simultaneously passed through the central conduit 18 and outer annular passage 14 of said burner. The free-oxygen containing gas is selected from the group consisting of substantially pure oxygen i.e. greater than 95 mole percent $O_2$. oxygen enriched air i.e. greater than 21 mole percent $O_2$, and air. The free-oxygen containing gas is supplied at a temperature in the range of about 100° F. to 1000° F. The aqueous slurry of pretreated sewage sludge with or without solid carbonaceous fuel e.g. coal is passed through the intermediate annular passage 16 at a temperature in the range of about ambient to 650° F.

In the partial oxidation process, the weight ratio of $H_2O$ to carbon in the feed is in the range of about 0.2 to 3.0, such as about 1.0 to 2.0. The atomic ratio of free-oxygen to carbon in the feed is in the range of about 0.85 to 1.5, such as about 1.0 to 1.2. Advantageously, the high amount of combined oxygen in the sewage sludge reduces the amount of free-oxygen.

The relative proportion of solid fuels, sewage sludge, water and oxygen in the feedstreams to the partial oxidation gas generator are carefully regulated to convert a substantial portion of the carbon in the fuel e.g., up to about 90% or more by weight, to carbon oxides; and to maintain an autogenous reaction zone temperature in the range of about 1800° F. to 3500° F. The pressure is in the range of about 1-300 atmospheres. Preferably the temperature in the gasifier is in the range of about 2200° F. to 2800° F., so that molten slag is produced.

The dwell time in the reaction zone is in the range of about 1 to 10 seconds, and preferably in the range of about 2 to 8 seconds. With substantially pure oxygen feed to the partial oxidation gas generator, the composition of the effluent gas from the gas generator in mole percent dry basis may be as follows: $H_2$ 10 to 60, CO 20 to 60, $CO_2$ 5 to 40, $CH_4$ 0.01 to 5, $H_2S+COS$ 0 to 5, $N_2$ nil to 5, and Ar nil to 1.5. With air feed to the gas generator, the composition of the generator effluent gas in mole percent dry basis may be about as follows: $H_2$ 2 to 20, CO 5 to 35, $CO_2$ 5 to 25, $CH_4$ 0 to 2, $H_2S+COS$ 0 to 3, $N_2$ 45 to 80, and Ar 0.5 to 1.5. Unconverted carbon, ash, or molten slaq are contained in the effluent gas stream. Depending on the composition and use, the effluent gas stream from the partial oxidation gasifier is called synthesis gas, reducing gas, or fuel gas. Coal has a high ash content e.g. about 10 to 30 wt. %. Advantageously, when coal is used as the supplemental fuel the coal ash will encapsulate the non-combustible materials in the sewage sludge, and the encapsulated material will flow from the reaction zone of the gas generator as substantially inert non-contaminating ash and molten slag.

The hot gaseous effluent stream from the reaction zone of the synthesis gas generator is quickly cooled below the reaction temperature to a temperature in the range of about 250° F. to 700° F. by direct quenching in water, or by indirect heat exchange for example with water to produce steam in a gas cooler. The gas stream from the partial oxidation gasifier or the flue gas from the furnace, boiler, or incinerator may be cleaned and purified by conventional methods. For example, reference is made to coassigned U.S. Pat. No. 4,052,176, which is included herein by reference for removal of $H_2S$, COS, and $CO_2$. Fly-ash and slag may be removed by quenching the process gas stream in a conventional quench tank and/or by scrubbing. See coassigned U.S. Pat. Nos. 3,232,728; 3,524,630; and 4,801,307, which are incorporated herein by reference.

Although modifications and variations of the invention may be made without departing from the spirit and scope thereof, only such limitations should be imposed as are indicated in the appended claims.

I claim:

1. A process for disposing of sewage sludge comprising:
    (1) concentrating an aqueous slurry of sewage sludge to a solids content in the range of about 5 to 35 wt. % to form a dewatered aqueous slurry of sewage sludge;
    (2) preheating and shearing the dewatered aqueous slurry of sewage sludge from (1) at a temperature in the range of about 130° F. to 210° F. in the absence of air, and holding same at said elevated temperature for about 0.5 to 5.0 minutes;
    (3) heating the aqueous slurry of sewage sludge from (2) in the absence of air at a temperature in the range of about 300° F. to 450° F. and at a pressure above the vapor pressure of water at that temperature, and holding same at said elevated temperature for about 1.0 to 10.0 minutes;
    (4) hydrothermally treating the aqueous slurry from (3) in an autoclave in the absence of air and holding said material in said autoclave for about 30 to 90 minutes at a temperature in the range of about 475° F. to 550° F. and a pressure above the vapor pressure of water at that temperature;
    (5) increasing the solids content of the aqueous slurry of sewage sludge from (4) to about 30 to 58 wt. % to form a pumpable slurry of sewage sludge;
    (6) mixing a chelating agent in the amount in the range of about 0.05 to 1.0 wt. % with the aqueous slurry of sewage sludge in steps (2) and/or (5) to reduce the viscosity of the aqueous slurry of sewage sludge and to suppress coagulation; and
    (7) burning said pumpable slurry of sewage sludge from (5) in a partial oxidation gasifier, furnace, boiler, or incinerator to produce a hot raw effluent gas stream.

2. The process of claim 1 wherein the chelating agent in (6) is an aminopolycarboxylic acid or a hydrocarboxylic acid.

3. The process of claim 2 wherein said chelating agent is nitriloacetic acid.

4. The process of claim 1 wherein the chelating agent in (6) is selected from the group consisting of: ethylenediaminetetra acetic acid, N-dihydroxyethylene acid, and N-dihydroxyethylene glycerine.

5. The process of claim 1 wherein said chelating agent in (6) is selected from the group consisting of tartaric acid, citric acid, gluconic acid, and 5-sulfosalicyclic acid.

6. The process of claim 1 wherein the aqueous slurry of sewage sludge is concentrated in (1) by any one or a combination of the following steps:
    a. belt filter pressing,
    b. centrifuging,
    c. hydrocloning.

7. The process of claim 1 where in step (3) said aqueous slurry of sewage sludge from step (2) is heated by passing it through a double tube indirect heat exchanger, spiral heat exchanger, or shell and tube heat exchanger.

8. The process of claim 1 where in step (3) said aqueous slurry of sewage sludge from step (2) is heated by direct contact with hot nitrogen gas or steam.

9. The process of claim 1 where in step (5) the solids content of said aqueous slurry of sewage sludge is increased by at least one of the following steps:
  (a) Flash evaporation of excess water;
  (b) Cooling said aqueous slurry of sewage sludge to a temperature in the range of about 75° F. to 150° F. and flashing off and/or centrifuging off excess water;
  (c) Cooling said aqueous slurry of sewage sludge to a temperature in the range of about 75° F. to 180° F. and adding dry powdered solid carbonaceous fuel; and
  (d) Cooling said aqueous slurry of sewage sludge to a temperature in the range of about 75° F. to 180° F. and mixing same with a pumpable aqueous slurry of solid carbonaceous fuel having a solids content in the range of about 45 to 60 wt. % to provide a pumpable aqueous slurry of sewage sludge and solid carbonaceous fuel having a solids content in the range of about 48 to 58 wt. % and containing about 8 to 60 wt. % sewage sludge.

* * * * *